(12) United States Patent
Coelho et al.

(10) Patent No.: US 12,566,884 B2
(45) Date of Patent: Mar. 3, 2026

(54) MULTIMODAL FINGERPRINTING OF DIGITAL ASSETS

(71) Applicant: Aurascape, Santa Clara, CA (US)

(72) Inventors: Jean-Luc Nacif Coelho, Sunnyvale, CA (US); Shayan Sadigh, Santa Clara, CA (US); Xingsi Zhong, Santa Clara, CA (US); Ho Yu Lam, Santa Clara, CA (US)

(73) Assignee: Aurascape, Santa Clara, CA (US)

( * ) Notice: Subject to any disclaimer, the term of this patent is extended or adjusted under 35 U.S.C. 154(b) by 0 days.

(21) Appl. No.: 19/214,617

(22) Filed: May 21, 2025

(65) Prior Publication Data

US 2025/0363235 A1 Nov. 27, 2025

Related U.S. Application Data

(60) Provisional application No. 63/650,254, filed on May 21, 2024.

(51) Int. Cl.
*G06F 21/62* (2013.01)

(52) U.S. Cl.
CPC ................................ *G06F 21/6227* (2013.01)

(58) Field of Classification Search
None
See application file for complete search history.

(56) References Cited

U.S. PATENT DOCUMENTS

| | | | |
|---|---|---|---|
| 9,032,531 B1 * | 5/2015 | Scorvo | G06F 21/6254 |
| | | | 726/25 |
| 10,826,854 B1 | 11/2020 | Ledet | |
| 10,873,697 B1 | 12/2020 | Jain et al. | |
| 11,962,546 B1 | 4/2024 | Hattangady et al. | |

(Continued)

FOREIGN PATENT DOCUMENTS

| | | | | |
|---|---|---|---|---|
| CN | 111639198 A * | 9/2020 | ............. | G06N 3/045 |
| IN | 202341085188 A | 1/2024 | | |
| WO | WO-2007081960 A2 * | 7/2007 | ............. | G06Q 40/08 |

OTHER PUBLICATIONS

International Search Report and Written Opinion in International Application No. PCT/US2025/030320, mailed on Jul. 21, 2025, 10 pages.

(Continued)

*Primary Examiner* — Benjamin E Lanier

(74) *Attorney, Agent, or Firm* — Fish & Richardson P.C.

(57) ABSTRACT

Some aspects of the present disclosure relate to a system that uses source connectors to integrate with various user-defined data sources containing proprietary information. The source connectors read data files from the user-defined data sources and send the data files to an input classifier, which associates each data file with a corresponding object extraction pipeline based on a file type and/or encoding format of the data file. The system uses multiple object extraction pipelines to extract representational data objects from the data files. The representational data objects are then processed by various fingerprinting modules of the system. These fingerprinting modules are configured to generate a set of multimodal fingerprints for each data file based on the representational data object(s) associated with the data file. The multimodal fingerprints are then indexed/stored in a database for later use.

18 Claims, 5 Drawing Sheets

(56) References Cited

U.S. PATENT DOCUMENTS

| 2007/0139231 A1* | 6/2007 | Wallia ................. H04L 63/1425 |
| | | 341/50 |
| 2011/0145560 A1 | 6/2011 | Moon et al. |
| 2015/0312125 A1* | 10/2015 | Subramanian .......... H04L 69/22 |
| | | 709/224 |
| 2016/0301693 A1* | 10/2016 | Nikulin ................. H04L 9/3247 |
| 2021/0084063 A1 | 3/2021 | Triantafillos et al. |
| 2021/0141823 A1 | 5/2021 | Das et al. |
| 2021/0350007 A1 | 11/2021 | Shih |
| 2022/0036064 A1 | 2/2022 | Wang et al. |
| 2022/0400157 A1 | 12/2022 | Martin et al. |
| 2023/0343331 A1 | 10/2023 | Manuvinakurike et al. |
| 2023/0403363 A1 | 12/2023 | Stanley et al. |
| 2024/0078337 A1 | 3/2024 | Kamyshenko et al. |
| 2024/0120046 A1 | 4/2024 | Shelton et al. |
| 2025/0156567 A1 | 5/2025 | Belgi et al. |
| 2025/0190444 A1 | 6/2025 | Patil et al. |

OTHER PUBLICATIONS

International Search Report and Written Opinion in International Application No. PCT/US2025/030398, mailed on Jul. 21, 2025, 34 pages.

* cited by examiner

MULTIMODAL FINGERPRINTING OF DIGITAL ASSETS

CROSS-REFERENCE TO RELATED APPLICATIONS

This application claims priority to U.S. Provisional Application No. 63/650,254, filed May 21, 2024, the entirety of which is incorporated herein by reference.

TECHNICAL FIELD

This disclosure relates generally to network security and data loss prevention (DLP).

BACKGROUND

DLP processes aim to ensure that sensitive information, such as personally identifying information (PII), intellectual property, and other proprietary information, is not lost, misused, or accessed by unauthorized users. However, conventional DLP schemes may not cover certain file types, which can lead to inadvertent or malicious data exposure.

SUMMARY

In accordance with the techniques described herein, a system may generate, store, and use multimodal fingerprints to protect a wide range of digital assets and media types. The system uses one or more source connectors to integrate with various user-defined data sources that contain proprietary information. The source connectors read data files from the user-defined data sources and send the data files to an input classifier, which associates each data file with a corresponding object extraction pipeline based on a file type and/or encoding format of the data file. The system uses multiple object extraction pipelines to extract representational data objects from the data files. The representational data objects are then processed by various fingerprinting modules of the system. These fingerprinting modules are configured to generate a set of multimodal fingerprints for each data file based on the representational data object(s) associated with the data file. The multimodal fingerprints are then indexed/stored in a database for later use.

One aspect of the present disclosure relates to a system, including: one or more data source connectors configured to (i) integrate with one or more user-defined data sources including proprietary information and (ii) read a set of data files from the one or more user-defined data sources; at least one data input classifier configured to associate each data file of the set of data files with an object extraction pipeline based on at least one of a file type of the data file or an encoding format of the data file; two or more object extraction pipelines configured to extract a set of representational data objects from the set of data files; a set of fingerprinting modules configured to generate a set of multimodal fingerprints for each data file of the set of data files based on the set of representational data objects; and a database configured to store the set of multimodal fingerprints generated by the set of fingerprinting modules.

In some implementations, the set of data files include audio files, image files, video files, design files, tabular data files, code files, binary files, unstructured data files, or any combination thereof.

In some implementations, the two or more object extraction pipelines are further configured to filter out non-proprietary information from the set of data files before the set of representational data objects are extracted from the set of data files.

In some implementations, the system further includes a web crawler configured to obtain non-proprietary data from a set of public data sources.

In some implementations, the set of fingerprinting modules are further configured to generate a set of multimodal fingerprints for the non-proprietary data obtained from the set of public data sources.

In some implementations, the two or more object extraction pipelines are further configured to (i) extract metadata tags from the set of data files and (ii) store the extracted metadata tags in the database.

In some implementations, the system further includes a threat detection entity configured to determine whether an outgoing file includes proprietary information by comparing the set of multimodal fingerprints stored in the database with a set of fingerprints associated with the outgoing file.

In some implementations, the threat detection entity is further configured to block transmission of the outgoing file in response to determining that the outgoing file includes proprietary information.

In some implementations, the threat detection entity is further configured to allow transmission of the outgoing file in response to determining that the outgoing file is devoid of proprietary information.

In some implementations, the one or more user-defined data sources include a local data store, a cloud storage location, a file hosting source, a data lake, or any combination thereof.

In some implementations, the set of representational data objects include a graph, a vector, a pixel matrix, a video frame, an audio sample, text, raw bytes, compiled graph structures, compiled binary files, or any combination thereof.

In some implementations, the set of multimodal fingerprints include multidimensional vectors that represent semantic or structural features of the proprietary information contained in the data file.

In some implementations, the at least one data input classifier is configured to associate each data file of the set of data files with at least one object extraction pipeline of the two or more object extraction pipelines according to a set of user-defined rules.

In some implementations, at least one object extraction pipeline of the two or more object extraction pipelines is configured to output representational data objects to (i) a fingerprinting module of the set of fingerprinting modules and (ii) a non-fingerprinting engine that is configured to process the representational data objects.

Another aspect of the present disclosure relates to a method, including: integrating, via one or more data source connectors, a system with one or more user-defined data sources including proprietary information; reading, via the one or more data source connectors, a set of data files from the one or more user-defined data sources; associating, by at least one data input classifier, each data file of the set of data files with an object extraction pipeline based on at least one of a file type of the data file or an encoding format of the data file; extracting, by two or more object extraction pipelines, a set of representational data objects from the set of data files; generating, by a set of fingerprinting modules, a set of multimodal fingerprints for each data file of the set of data files based on the set of representational data objects; and storing, in a database, the set of multimodal fingerprints generated by the set of fingerprinting modules.

In some implementations, the set of data files include audio files, image files, video files, design files, tabular data files, code files, binary files, unstructured data files, or any combination thereof.

In some implementations, the method further includes scanning a customer-defined database for data files that include non-proprietary or public information.

In some implementations, the method further includes filtering, by the two or more object extraction pipelines, non-proprietary information from the set of data files before extracting the set of representational data objects from the set of data files.

In some implementations, the method further includes determining, by a threat detection entity, whether an outgoing file includes proprietary information by comparing the set of multimodal fingerprints stored in the database with a set of fingerprints associated with the outgoing file.

In some implementations, the method further includes blocking, by the threat detection entity, transmission of the outgoing file in response to determining that the outgoing file includes proprietary information.

Although some implementations are described in the context of network security devices and services, the multimodal fingerprinting techniques described herein can be used in places other than networks, such as a software as a service (SaaS) deployment where fingerprints are used to discover full or partial snippets of data in other services, storage, or mediums. For example, a video from a communication application (e.g., Zoom or Microsoft Teams) or corresponding slides/transcripts in an email could be discovered after scanning an email application (e.g., Microsoft Outlook) using SaaS application connectors. Additionally, or alternatively, the fingerprinting techniques can be used inline in a network security service. The multimodal fingerprints generated by the system are not limited to DLP, and can also be used for data discovery in sanctioned or unsanctioned locations/applications.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
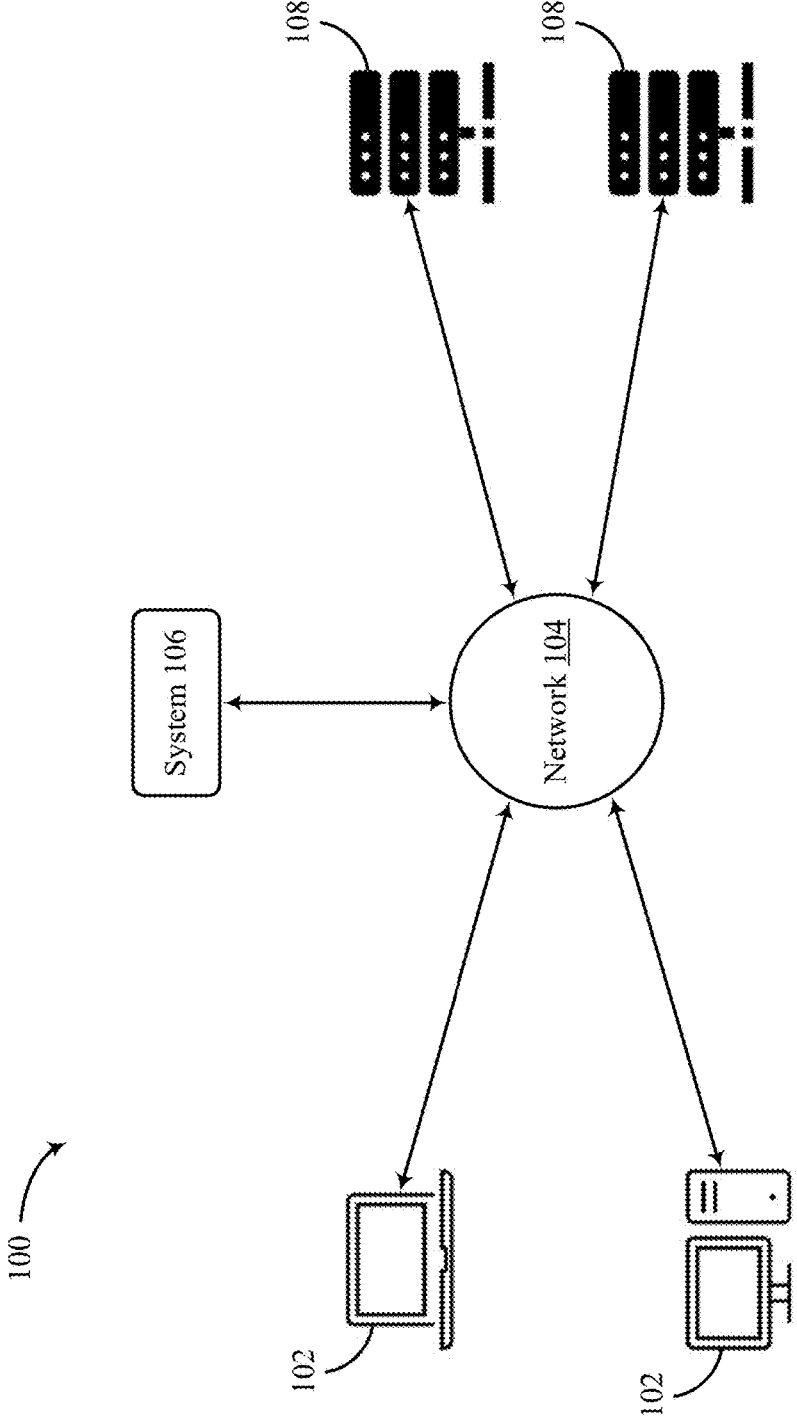
FIG. 1 is a schematic diagram of a computing environment that supports multimodal fingerprinting of digital assets in accordance with aspects of the present disclosure.

Data breaches are a pervasive threat to organizations across industries, with the consequences ranging from financial losses to reputational damage. Traditional DLP solutions have long been deployed to mitigate these risks, but often fall short in covering the growing diversity of digital assets. From text documents and images to audio files, videos, design files, and the like, modern organizations possess a wide range of file types that traditional DLP approaches struggle to effectively monitor and protect. Although some implementations of the present disclosure are described in the context of DLP, the techniques described herein can be used for a wide range of applications outside of DLP.

The limitations of traditional DLP solutions become particularly evident when dealing with unstructured data, such as images, videos, or audio files. These formats are often difficult to categorize or analyze using traditional methods, and traditional DLP solutions can also not correlate content across media types, leaving them vulnerable to unauthorized access or exfiltration. Furthermore, the increasing use of multimedia and mixed-media content in everyday business operations has further expanded the scope of files that require protection.

In accordance with aspects of the present disclosure, a system may scan and classify proprietary information by leveraging multimodal artificial intelligence (AI) to fingerprint data, providing greater visibility and control over a vast array of file types (including unstructured data files). The system does not store original data, relying instead on representational objects that cannot be used to recreate the original content. By leveraging AI and multimodal fingerprints, the system described herein provides a comprehensive and scalable defense against data exposure, loss, theft, etc.

The multimodal fingerprinting framework described herein provides organizations with granular, scalable control of various digital asset types (structured and unstructured) by automatically classifying files, converting those files into representational objects, generating irreversible high-dimensional fingerprints of each representational object, and indexing those fingerprints in a database. At run-time, the system can inspect outgoing file transfers and compare fingerprints of outgoing files to fingerprints of other files with proprietary information. If PII or other protected content is detected, the system can block the file transfer, trigger real-time alerts to system administrators, quarantine the file, or enforce custom policies (e.g., redaction or encryption). By identifying correlations across media types (e.g., matching code in a screenshot to original source code) and leveraging public-data fingerprints to reduce false positives, the techniques described herein can prevent unauthorized exfiltration and provide greater visibility without storing any sensitive or proprietary data. Accordingly, in at least some implementations, the techniques described herein can improve the effectiveness of computer systems (e.g., network security systems and/or DLP systems) compared to those that do not implement these techniques.

FIG. 1 is a schematic diagram of a computing environment 100 that supports multimodal fingerprinting of digital assets in accordance with aspects of the present disclosure. The computing environment 100 includes client devices 102, servers 108, and a system 106, which may communicate via a network 104. The system 106 is deployed in the network 104 and acts as a proxy for connections between the client devices 102 and the servers 108.

The network 104 may include one or more wired connections, such as copper cabling, fiber optics, or other conductive materials that form physical links between network endpoints. Additionally, or alternatively, the network 104 may include one or more wireless connections that employ radio frequency (RF) signals, infrared (IR) communications, or other non-tethered means for data transmission.

In some examples, the network 104 is equipped with one or more routers, switches, and security gateways that manage the data traffic flow, enforce security policies, and maintain network integrity. The network 104 may be configured with mechanisms for error detection and correction, quality of service (QOS) management, and traffic prioritization to optimize the efficiency and reliability of data transmission across the network 104.

The client devices 102 can interface with the network 104 to access, process, or exchange data with other client devices 102 and servers 108. One or more of the client devices 102 can be configured to operate within a network environment that includes various other computing entities/resources. Each of the client devices 102 may include one or more processing units capable of executing instructions, one or more memory components for storing data and instructions, and communication hardware to facilitate wired or wireless connectivity in the network 104. Examples of client devices 102 include (but are not limited to) a portable handheld device, a wearable device, a desktop computer, or any other electronic device capable of sending and/or receiving data.

One or more of the client devices 102 can be equipped with one or more input mechanisms, such as a touchscreen interface, keyboard, mouse, stylus, or voice recognition sensors, to allow a user to interact with applications and services provided through the network. One or more of the client devices 102 can be equipped with one or more output mechanisms, such as a display screen, audio speakers, or haptic feedback devices to convey information to the user.

In some examples, one or more of the client devices 102 can be further equipped with power management components to optimize energy consumption, including a battery and power control logic. One or more of the client devices 102 can be configured to support various forms of network protocols and standards to ensure compatibility and interoperability with the broader network ecosystem. Software components installed on the client devices 102 can enable a range of functions from basic data processing and communication to advanced computational tasks, facilitated by the operating system and application software. One or more of the client devices 102 can have a modular design that allows for extensibility and upgrades through additional hardware or software modules, ensuring adaptability to evolving technologies and user requirements.

In some implementations, one or more of the client devices 102 are used by or associated with entities (e.g., employees) of an enterprise, such as an organization or a corporation. For example, the client devices 102 can be computers used by employees of an enterprise. In some implementations, one or more of the client devices 102 are used by individual users. For example, in such implementations, one or more of the client devices 102 can be personal computers of individual users.

In some implementations, one or more of the servers 108 are configured to manage, store, and disseminate data across the network 104. In some implementations, one or more of the servers 108 are comprised of high-performance hardware components including, but not limited to, one or more central processing units (CPUs) for executing programmatic instructions, volatile memory (RAM) for temporary data storage and rapid access, and non-volatile memory (such as HDDs or SSDs) for persistent data storage. In such implementations, these components are interconnected via a high-speed bus system and are housed within a chassis that is scalable to accommodate additional hardware resources as needed.

In some implementations, one or more of the servers 108 are configured to include network interface components that facilitate connectivity with various network topologies, supporting both wired and wireless communication standards to service multiple client devices concurrently. In some implementations, one or more of the servers 108 operate under a server operating system that manages system resources and provides a stable platform for server applications, including (but not limited to) web services, database management systems, file services, and application servers.

In some implementations, one or more of the servers 108 are configured with software-defined networking capabilities to allow for dynamic network configuration, optimizing data flow and resource allocation based on real-time network demands. In such implementations, the software-defined networking capabilities provide security mechanisms, featuring advanced encryption standards, secure access protocols, and an intrusion detection and prevention system (IDPS) to safeguard against unauthorized access and potential threats.

In some implementations, one or more of the servers 108 are capable of virtualization, creating multiple virtual machines (VMs) on a single physical hardware platform, each running distinct operating systems and applications. In such implementations, virtualization can be facilitated by a hypervisor, which abstracts processor, memory, storage, and other resources into multiple execution environments, which enhances server efficiency and flexibility in providing services.

In some implementations, one or more of the servers 108 are configured for scalability and high availability, with redundant power supplies, network connections, and storage systems to maintain operational continuity. Advanced management tools can be provided for configuring, monitoring, and maintaining the server's performance and health, which can be accessed locally or remotely, ensuring effective and efficient administration of network resources.

In some implementations, one or more of the servers 108 host applications that are used by the enterprise users. In some implementations, one or more of the servers 108 are associated with (e.g., owned, administrated) third-party providers. In some implementations, these applications include generative AI applications, such as ChatGPT, Google Bard, Replika, Jasper, Copy.ai, GitHub Copilot, DeepL Translator, DALL-E, Soundraw.io, AIVA, Runway ML, Chatbot services by IBM Watson, Zo Convert, etc. In some implementations, these applications include do-it-yourself (DIY) or custom enterprise AI applications, for example, based on a generative AI model such as Support CoPilot. In some implementations, the DIY enterprise applications are custom applications that are built internally at the enterprise.

In some implementations, the server applications hosted by the servers 108 include email, voice, video, or other textual data applications that incorporate generative AI tools or features, and the communications monitored by the system 106 include natural language data exchanged between the client devices 102 and various multimedia applications.

In some implementations, the system 106 is operable to safeguard communication networks from a spectrum of cyber threats and unauthorized access. In such implementations, the system 106 analyzes incoming and outgoing data traffic to ensure compliance with established security policies.

In some implementations, the system 106 includes one or more high-performance central processing units (CPUs) to manage the computational demands essential for inspecting and filtering substantial network traffic volumes. In some implementations, the system 106 include one or more memories, such as random-access memory (RAM), to facilitate the processing of active network connections and their associated security rulesets, as well as enabling rapid data retrieval. In some implementations, the system 106 includes multiple high-speed network interface cards (NICs) to interface with the network, supporting a range of bandwidth connections that may extend to 1 gigabyte per second (Gbps), 10 Gbps, or beyond. In some implementations, the system 106 includes a storage subsystem that utilizes flash memory or solid-state drives (SSDs) for the durable retention of the operating system, logs, configurations, and essential operational data.

In some implementations, the system 106 includes specialized security acceleration hardware to optimize cryptographic functions and bolster the performance of critical security operations, including encryption and decryption processes. In some implementations, the system 106 includes redundant power supplies to guarantee continuous functionality. In some implementations, the system 106 includes physical interfaces, such as universal serial bus (USB) ports for straightforward management, console ports for direct configuration, and, in some cases, high-definition multimedia interface (HDMI) ports for local display outputs.

In some implementations, the system 106 uses a multi-layered defense strategy consisting of a stateful firewall, an intrusion detection and prevention system (IDPS), and a deep packet inspection (DPI) engine. In such implementations, the firewall component operates by examining and filtering network traffic based on predetermined security rules, blocking or permitting data packets as they attempt to traverse the network boundary. The IDPS module monitors network activities for signs of malicious behavior, dynamically responding to potential threats by alerting system administrators and automatically taking preventative measures to thwart the attack. The DPI engine further enhances security measures by examining the data part of the traffic, beyond just the headers, allowing for a more granular analysis and real-time threat detection.

In some implementations, the system 106 is configured with an adaptive and modular architecture that allows for seamless integration of additional security functions such as antivirus filtering, anti-spam protection, virtual private network (VPN) management, and advanced content filtering. These security functions work in concert to detect and mitigate a variety of threats ranging from malware and phishing to network intrusions and data exfiltration attempts.

In some implementations, the system 106 is configured with an encryption framework that secures data transmission channels, preserving the confidentiality and integrity of sensitive information. User authentication mechanisms are embedded within the system, enforcing stringent access controls and user verification processes to ensure that only authorized personnel can access network resources.

In some implementations, the system 106 includes a management console that provides a centralized platform for configuring security parameters, monitoring network status, and analyzing logs and alerts generated by a security gateway. This console may support both local and remote management capabilities, enabling administrators to maintain optimal network security posture from any location.

The system 106 may be configured with advanced algorithms and machine learning techniques, allowing the system 106 to possess the capability to learn from traffic patterns, adapting security mechanisms in real-time to evolving threats. This proactive stance ensures that the network defense remains resilient and effective against sophisticated and emerging cyber threats.

In some implementations, the system 106 is deployed between client devices 102 and remote network servers 108 that the client devices 102 communicate with to use applications hosted by the servers 108. In such implementations, the system 106 is hosted in the network 104 and acts as a proxy in the network connections between the client devices 102 and the network servers 108.

In some implementations, the system 106 is provided with security credentials by the enterprise, enabling the system 106 to inspect the data in communications sessions between the client devices 102 and the server applications. In some examples, the data inspected by the system 106 includes natural language data. In some examples, the system 106 can process the data and perform security operations using one or more security large language models (LLMs).

The system 106 can be configured for easy insertion in a network connection between end user client devices 102 and remote server applications, and may be configured for capability evolution in dynamic environment. In some implementations, the system 106 is deployed as a man-in-the-middle between client devices 102 (e.g., members of a distributed enterprise) and remote server applications. In such implementations, the system 106 decrypts hypertext transfer protocol secure (HTTPS) sessions, processes the natural language contents of the HTTPS payload, and performs one or more security operations, such as: role-based access control; input query filtering for intellectual property, and sensitive data leakage, toxic language, personally identifiable information, and malicious queries; prompt generation and acceleration to reduce hallucinations; masking (anonymize) sensitive data; guarding against indirect prompt injections; and gaining visibility into user queries and/or application responses.

In some implementations, the system 106 uses field-programmable gate arrays (FPGAs), application-specific integrated circuits (ASICs), and other hardware to run one or more LLMs and/or to monitor natural language data between the client devices 102 and the servers 108.

In some implementations, the system 106 inspects natural language application traffic and provides security enforcement, which includes role-based access control, prompt generation and acceleration, data anonymization, guarding against indirect prompt injections, or moderating generative AI model responses, among other enforcement operations.

In some implementations, the system 106 implements one or more security LLMs as a cloud proxy. In such implementations, a security LLM is trained to implement security policies for natural language interactions, which includes processing natural language data and performing network security operations on the data based on the processing. The system 106 can provide a runtime security solution that processes data for multiple different third-party LLMs and LLM-based applications, including from vendor-specific LLMs, open-source LLMs, custom or tuned enterprise LLMs. The system 106 can also process third-party applications and/or DIY enterprise applications, among others.

In some implementations, a security LLM used by system 106 is an AI model with a large number of parameters, which can range from a few million to hundreds of billions. In such implementations, these parameters use a large number (e.g., hundreds) of leading-edge processing units and large amounts of time (e.g., weeks) to train, and a large number of processing units for inference. In some implementations, the processing units that are used by system 106 are realized using customized, task-specific silicon hardware and corresponding software. The hardware includes custom processors that are implemented in FPGAs or ASICs, among other suitable processing units. This hardware can be used to replace expensive graphical processing units (GPUs) from third-party vendors. In such implementations, the security LLM is supported by engineered hardware acceleration solutions (e.g., FPGAs or ASICs) that provide a highly performant and economical solution to the challenge of inspecting generative AI-bound application traffic and providing security enforcement. Accordingly, the system 106 can be configured for leading performance and highest scalability, while consuming a limited amount of power.

In some implementations, the system 106 is configured as a centralized repository and management console for security policies that dictate the security posture of an entire network infrastructure, to establish, manage, and distribute the security policies within the network environment. In some implementations, the system 106 includes one or more processing units and one or more memories. In such implementations, the one or more memories store instructions that, when executed by the processing units, facilitate the creation, modification, and enforcement of security policies. The system 106 can be equipped with a user interface that allows system administrators to intuitively interact with the policy server to define, update, and retire security policies as threats evolve or business requirements change.

In some implementations, the system 106 further includes a communication module to facilitate secure communication with the system 106. The communication module can ensure that policy updates are delivered in a secure and reliable manner, employing encryption and integrity checks to prevent unauthorized access or tampering in transit.

In some implementations, the system 106 is operable to receive feedback from the system 106 regarding the enforcement of the security policies and the observed network traffic. Such feedback can include logs, alerts, and metrics, which the system 106 can use to automatically refine or suggest modifications to the existing policies, thus enabling dynamic security management.

In some implementations, the system 106 is integrated with external data sources, such as threat intelligence feeds, to automatically update security policies in response to emerging threats. This proactive capability ensures that the system 106 is equipped with the most current and effective set of rules to defend against the latest security vulnerabilities and attack vectors.

In some implementations, the system 106 is capable of streamlining the administration of network security by serving as the authoritative system for policy lifecycle management, from policy creation through deployment and monitoring to policy decommissioning. This centralized control plane simplifies the complexity associated with managing distributed security infrastructure and provides a single point of reference for audit and compliance processes.

Figure 2:
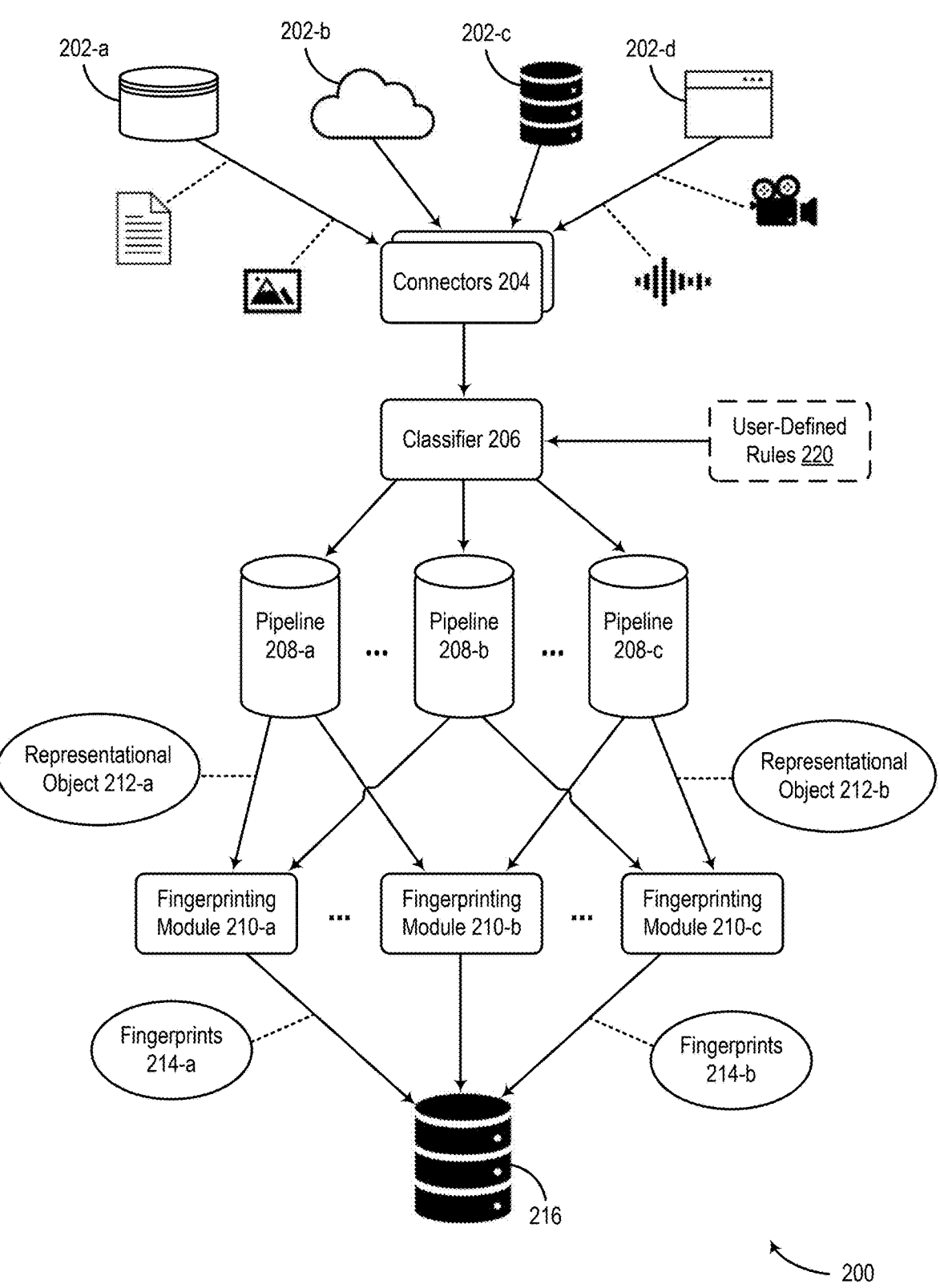
FIG. 2 is a schematic diagram of a multimodal fingerprinting process performed by a system of the computing environment depicted in FIG. 1.

FIG. 2 is a schematic diagram of a multimodal fingerprinting process 200 performed by the system 106 depicted in FIG. 1. As described herein, the system 106 includes one or more data source connectors 204 that support integration with various user-defined data sources 202, such as a local file store 202-*a*, a data lake 202-*b*, a file hosting service 202-*c*, a public data source 202-*d*, etc. The system 106 also includes an automatic input classifier 206 that identifies input type and format (e.g., tabular data, audio, video) and detects the specific kind of data encoding.

Additionally, the system 106 includes object extraction pipelines 208 that specialize in a particular file type. These pipelines extract informational tags from the data being scanned, such as proprietary computer code, internal design diagrams, financial information, etc. More details about the semantic tagging process employed by the object extraction pipelines 208 can be found in copending U.S. application entitled "MULTIMODAL CONTENT INTERPRETATION OF DIGITAL ASSETS," filed May 21, 2024, the entire contents of which are incorporated herein by reference. The system 106 can include an object extraction pipeline 208-*a* that specializes in design files (e.g., computer-aided design (CAD) files, chip design files), and an object extraction pipeline 208-*b* that specializes in video files, an object extraction pipeline 208-*c* that specializes in audio files. Other object extraction pipelines 208 may specialize in binary files, images, code files, text files, or other unstructured file types.

The object extraction pipelines 208 can extract representational data objects 212 from the data files. For example, the object extraction pipeline 208-*a* can extract representational data objects 212-*a* (such as vectors, text, or other custom geometric representations) from design files. The object extraction pipeline 208-*b* can extract frames, audio data, text, or diagrams from video files. The object extraction pipeline 208-*c* can extract representational data objects 212-*b* (such as raw bytes, text, or images) from audio files. Additionally, or alternatively, one of the object extraction pipelines 208 may be configured to extract pixel matrices, vectors, or text from image files, one of the object extraction pipelines 208 may be configured to extract raw text, graph structures, or binary files from code files, and one of the object extraction pipelines 208 may be configured to extract raw byte arrays, structured data, or computer instructions from binary files.

The representational data objects 212 extracted by the object extraction pipelines 208 are sent to fingerprinting modules 210 that each specialize in a particular data/object type. In some implementations, one fingerprinting module 210-*a* may specialize in text, another fingerprinting module 210-*b* may specialize in graph structures, and another fingerprinting module 210-*c* may specialize in video frames. The fingerprinting modules 210 use algorithms and other machine learning techniques to generate a set of multimodal fingerprints 214 for each data file. The multimodal fingerprints 214 are irreversible representations of the underlying data, meaning the multimodal fingerprints 214 cannot be used to recreate the original file.

Each fingerprinting module 210 reads a particular data type and generates multimodal fingerprints 214 for that data type. For example, a fingerprinting module 210-*a* may generate a set of multimodal fingerprints 214-*a* for an audio file, and a fingerprinting module 210-*c* may generate a set of multimodal fingerprints 214-*b* for a video file. The multimodal fingerprints 214 are then stored in a database 216, along with any metadata tags generated by the object extraction pipelines 208. This database 216 is used to determine (i) whether a given set of multimodal fingerprints 214 belong to a proprietary or sensitive data source or (ii) how similar a particular file/object is to other proprietary or sensitive data scanned by the system 106.

The multimodal fingerprints 214 are configured such that two fingerprints 214 generated from similar content can be matched/correlated, regardless of the medium from which the content originated. Additionally, the system 106 scans public facing data from user-defined data sources 202 and other general knowledge databases. This data is fingerprinted in a similar manner, but with no constraint on the fingerprints 214 being irreversible. This public facing set of fingerprints 214 can then be used to match/correlate data and reduce false positives in proprietary data detection.

Figure 3:
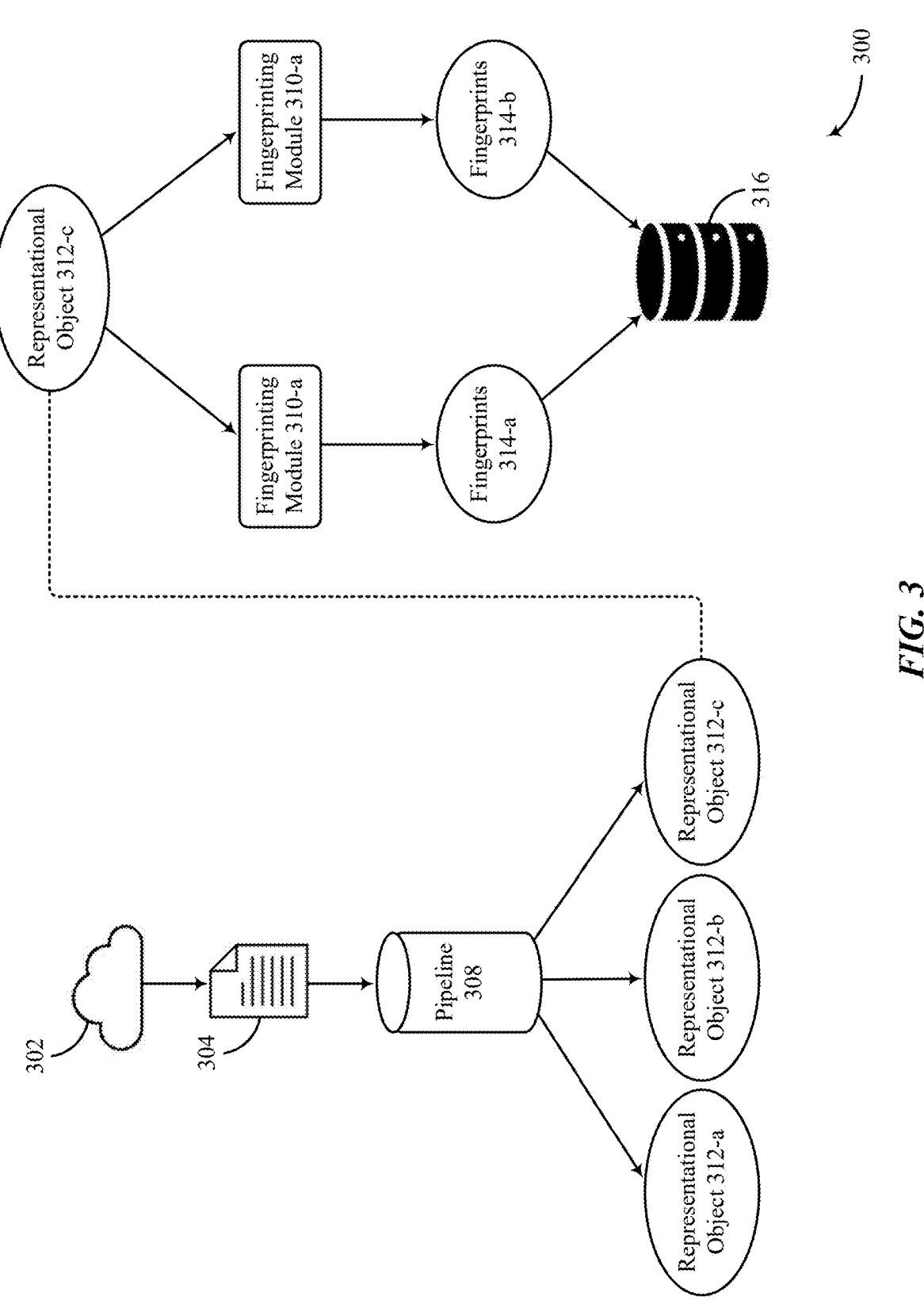
FIG. 3 is a schematic diagram of a multimodal fingerprinting process performed by the system.

FIG. 3 is a schematic diagram of a multimodal fingerprinting process 300 performed by the system 106 depicted in FIG. 1. The multimodal fingerprinting process 300 depicted in FIG. 3 may implement one or more features of the multimodal fingerprinting process 200, as shown and described with reference to FIG. 2. For example, the multimodal fingerprinting process 300 includes a user-defined data source 302, an data file 304, an object extraction pipeline 308, representational data objects 312, fingerprinting modules 310, and multimodal fingerprints 314, which may be examples of corresponding elements depicted in FIG. 2.

As described herein, the system 106 can use a data source connector 204 to read the data file 304 from the user-defined data source 302. The data file 304 is sent to a data input classifier 206, which assigns the data file 304 to the object extraction pipeline 308 based on the file type and/or encoding format of the data file 304. The object extraction pipeline 308 is configured to extract representational data objects 312 from the data file 304. The representational data objects 312 are then processed by fingerprinting modules 310 that specialize in a particular file/object type. The fingerprinting modules 310 are configured to generate a set of multimodal fingerprints 314 for the data file 304 based on the representational data objects 312 associated with the data file 304. The multimodal fingerprints 314 are then indexed/stored in a database 316 for later use.

In one example, the data file 304 is a Zoom video recording of an all-hands meeting. The representational data objects 312 extracted from the video recording may include a set of key frames (representational data object 312-*a*), an audio file (representational data object 312-*b*), roadmap descriptions and graphics (representational data object 312-*c*), tables with financial forecasts, transcribed text of proprietary information, design diagrams and respective graph representations, etc. The set of tagged fingerprints 314 may include a first set of fingerprints 314-*a* that represent key video frames in the video, a second set of fingerprints 314-*b* representing proprietary information mentioned orally during the video, a third set of fingerprints 314 representing design diagrams presented in the meeting, a fourth set of fingerprints 314 representing visual characteristics of prototypes presented in the meeting, a fifth set of fingerprints 314 representing sensitive financial forecasts from slides presented in the meeting, and so on.

In another example, the data file 304 is an image from a meeting room with a whiteboard and a screenshare in the background. The representational data objects 312 extracted from the image may include an extracted piece of software programming code from the whiteboard (representational data object 312-*a*), an image of a system design block diagram extracted from the screenshare (representational data object 312-*b*), a description of each extracted object, a graph representation of the system design block diagram (representational data object 312-*c*), a graph representation of the code, tags identifying the sensitive software code and internal design block diagram, etc. The resulting set of fingerprints 314 may include a first set of fingerprints 314-*a* representing the software programming code and a second set of fingerprints 314-*b* representing the system design block diagram.

In another example, the data file 304 is a register-transfer level (RTL) file representing a digital chip design. The representational data objects 312 extracted from the RTL file may include a raw text format of the RTL file (representational data object 312-*a*), an image representing the structure of the chip design (representational data object 312-*b*), a graph representation of the chip design (representational data object 312-*c*), a list of keywords used in the chip design (including codenames), and so on. The resulting set of fingerprints 314 may include a first set of fingerprints 314-*a* representing the chip design file.

Figure 4:
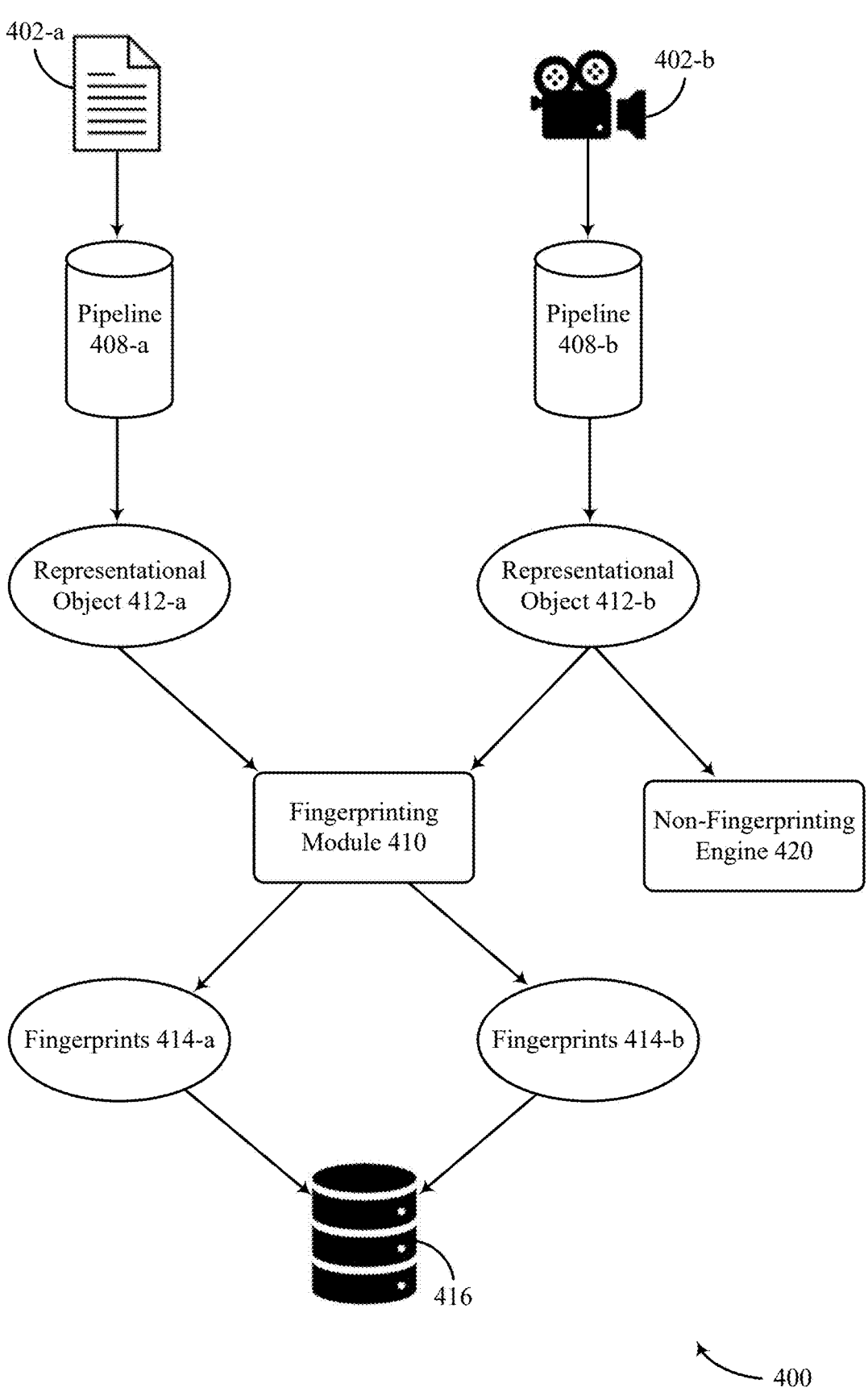
FIG. 4 is a schematic diagram of a multimodal fingerprinting process performed by the system.

FIG. 4 is a schematic diagram of a multimodal fingerprinting process 400 performed by the system 106 depicted in FIG. 1. The multimodal fingerprinting process 400 depicted in FIG. 4 may implement one or more aspects of the multimodal fingerprinting processes 200 and 300, as shown and described with reference to FIGS. 2 and 3. For example, the multimodal fingerprinting process 400 includes data files 402, object extraction pipelines 408, representational data objects 412, a fingerprinting module 410, and multimodal fingerprints 414, which may be examples of corresponding elements depicted in FIGS. 2 and 3.

As described herein, the system 106 supports a multimodal fingerprinting engine/system that collects data from user-defined data sources 202, classifies the into pipelines 408 tailored to each type of data, and uses AI to identify unknown data types. Each pipeline 408 reads the data, filters out non-proprietary information, and processes the data into representational objects 412 that get passed through multiple fingerprinting modules 410 to generate multimodal fingerprints 414.

The system is designed to process a wide range of file types, including those that traditional DLP systems struggle with. The fingerprints 414 generated by the system are irreversible, meaning they cannot be used to reverse-engineer or recreate the original sensitive information. An input classifier 206 detects the kind of data (such as tabular data, audio, video) and the file encoding type. The input classifier 206 then classifies the file into a particular set of pipelines 408. Unknown file types are classified based on a best match, as decided by the input classifier 206. The input classifier 206 may be configured to classify and/or associate files with pipelines 208 according to user-defined rules 220. In some implementations, the user-defined rules 220 include scan filters that indicate specific files, file types, and/or data sources 202 for the classifier 206 to process. In other implementations, the user-defined rules 220 determine where specific files and/or file types are sent. For example, the user-defined rules 220 may instruct the classifier 206 to send images to pipeline 208-*a*, videos to pipeline 208-*b*, audio files to pipeline 208-*c*, etc. The user-defined rules 220 are an optional input to the classifier 206, and serve to augment the classification process. In some implementations, files that would otherwise be routed to the video pipeline 208-*b* may be skipped or redirected based on the user-defined rules 220. For example, a user may configure the classifier 206 to skip files with specific metadata and/or to send unknown file types to a specific pipeline 208.

Files 402 are then read by the pipelines 408 and converted into representational objects 412 that model the underlying data in different formats. For example, a design file may be modeled as a graph, and an image may be modeled by the text contained therein. The pipelines 408 also extract tags from the data, such as public financial information, proprietary code, design diagram, etc. Once generated, the representational objects are then sent to a series of fingerprinting modules 410, each specializing in a particular type of object. The fingerprinting modules 410 use various algorithms and machine learning techniques to generate multimodal fingerprints.

The object extraction pipelines 408 (also referred to as data processing pipelines) each specialize in a set of data types. Data is fed into these pipelines 408 and transformed into several different representations of the associated content. In a text pipeline 408-*a*, for instance, raw text data can be used or converted into a linguistic analysis object or graph that represents the semantic meaning of text and other characteristics of the data. The representational data objects 412 contain information that can be used to recreate the original data, so the representational data objects 412 are not stored in the database 416. Rather, they are sent to the fingerprinting module 410 (also referred to as a fingerprinting engine) for further processing.

After the data is processed into different representational objects 412, the fingerprinting module 410 converts the representational objects 412 into irreversible, multimodal fingerprints 414. This process involves sending the data to specialized engines that can extract the meaning of the representational data objects 412 and represent them as high-dimensional vectors or other forms of data. As depicted in FIG. 3, some representational data objects 312 can be sent to multiple fingerprinting engines, such as a semantic fingerprinting engine (fingerprinting module 310-*a*) and a structural fingerprinting engine (fingerprinting module 310-*b*). Each engine then generates specific fingerprints 314 that represent a particular aspect of the object.

As depicted in the example of FIG. 4, different media types can yield the same kind of representational data objects 412. For example, the object extraction pipeline 408-*a* may extract proprietary source code (representational data object 412-*a*) directly from a text file 402-*a*, and an object extraction pipeline 408-*b* may extract the same proprietary source code (representational data object 412-*b*) from a screenshot or frame of a video file 402-*b* in which the source code is displayed. These representational data objects 412 then produce fingerprints 414-*a* and 414-*b* (e.g., type A fingerprints), which can be correlated/matched by the system 106. Some types of fingerprints 414 can also be cross correlated, meaning a type B fingerprint (e.g., a fingerprint of a raw text object) can be compared/correlated with a type C fingerprint (e.g., a fingerprint of a graph representation).

In addition to scanning private data, the system also scans public data, both from known data sources and user provided ones. For example, the system may scan a customer-defined database, such as a cloud drive with already released earnings reports. The objective of this process is to differentiate public data and private/sensitive data. When data is retrieved at run-time (e.g., when a file transfer is initiated), the system can determine whether a particular data segment is public or not. This can help reduce the likelihood of false positives in data matching to proprietary data.

In some implementations, representational data objects 412 generated by the object extraction pipelines 408 are sent to a non-fingerprinting engine 420 for processing. The non-fingerprinting engine 420 can use the representational data objects 412 extracted from the files 402 to perform additional document classification, PII detection, sensitivity analysis, etc.

Figure 5:
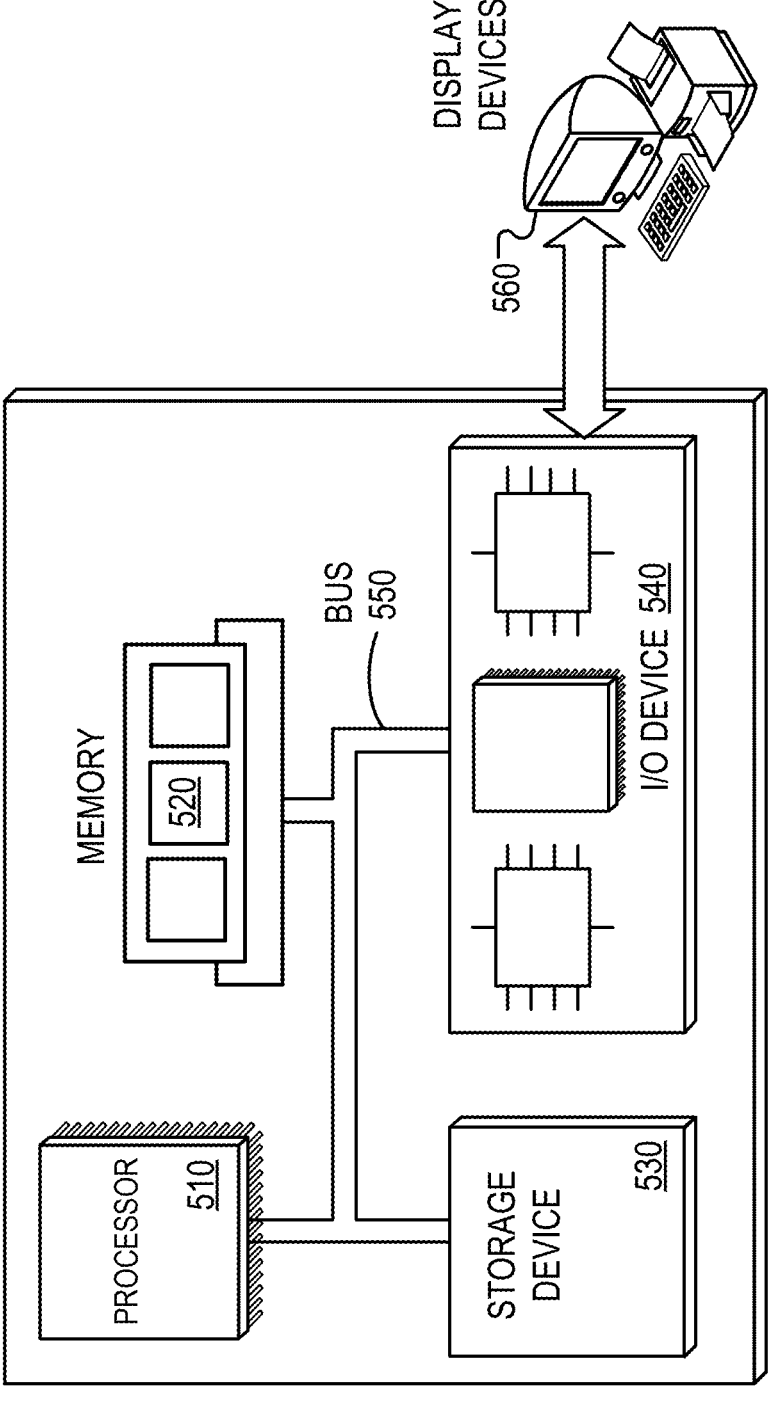
FIG. 5 is a schematic diagram of a computer system that supports multimodal fingerprinting of digital assets in accordance with aspects of the present disclosure. Like reference numbers and designations in the drawings indicate like elements.

FIG. 5 is a schematic diagram of an example computer system 500. In some implementations, the computer system 500 may include or be a part of one or more of the entities described herein, such as the client devices 102, the system 106, the servers 108, the database 216, etc. As depicted in FIG. 5, the computer system 500 includes a processor 510, a memory 520, a storage device 530 and an input/output device 540. Each of these components can be interconnected, for example, by a system bus 550. The processor 510 is capable of processing instructions for execution within the computer system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500. Although the computer system 500 is shown as having one processor 510, one memory 520, and one storage device 530 for illustrative purposes, the computer system 500 can include any number of processors 510, memories 520, and storage devices 530 based on system requirements.

The input/output device 540 provides input/output operations for the computer system 500. In some implementations, the input/output device 540 can include one or more of a network interface device (for example, an Ethernet card), a serial communication device (for example, an RS-232 port), or a wireless interface device (for example, an 802.11 card, a 3G wireless modem, a 4G wireless modem, or a 5G wireless modem), or some combination thereof. In some implementations, the input/output device can include driver devices configured to receive input data and send output data to other input/output devices, for example, a keyboard, printer, and/or display devices 560. In some implementations, mobile computing devices, mobile communication devices, and other devices can also be used.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

What is claimed is:

1. A system, comprising:

one or more processors; and memory storing instructions that, when executed by the one or more processors, cause the system to:

integrate with one or more user-defined data sources comprising proprietary information; and (ii)

read a plurality of data files from the one or more user-defined data sources;

associate each data file of the plurality of data files with an object extraction pipeline based on at least one of a file type of the data file or an encoding format of the data file, the object extraction pipeline comprising one or more data processing operations executable by the one or more processors;

filter out non-proprietary information from the plurality of data files before extracting a plurality of representational data objects from the plurality of data files;

generate a set of multimodal fingerprints for each data file of the plurality of data files based on the plurality of representational data objects; and store the set of multimodal fingerprints in a database.

2. The system of claim 1, wherein the plurality of data files comprise audio files, image files, video files, design files, tabular data files, code files, binary files, unstructured data files, or any combination thereof.

3. The system of claim 1, further comprising a web crawler configured to obtain non-proprietary data from a plurality of public data sources.

4. The system of claim 3, wherein the system is further configured to generate a set of multimodal fingerprints for the non-proprietary data obtained from the plurality of public data sources.

5. The system of claim 1, wherein the system is further configured to (i) extract metadata tags from the plurality of data files and (ii) store the extracted metadata tags in the database.

6. The system of claim 1, further comprising a threat detection entity configured to determine whether an outgoing file comprises proprietary information by comparing the set of multimodal fingerprints stored in the database with a set of fingerprints associated with the outgoing file.

7. The system of claim 6, wherein the threat detection entity is further configured to block transmission of the outgoing file in response to determining that the outgoing file comprises proprietary information.

8. The system of claim 6, wherein the threat detection entity is further configured to allow transmission of the outgoing file in response to determining that the outgoing file is devoid of proprietary information.

9. The system of claim 1, wherein the one or more user-defined data sources comprise a local data store, a cloud storage location, a file hosting source, a data lake, or any combination thereof.

10. The system of claim 1, wherein the plurality of representational data objects comprise a graph, a vector, a pixel matrix, a video frame, an audio sample, text, raw bytes, compiled graph structures, compiled binary files, or any combination thereof.

11. The system of claim 1, wherein the set of multimodal fingerprints comprise multidimensional vectors that represent semantic or structural features of the proprietary information contained in the data file.

12. The system of claim 1, wherein the system is configured to associate each data file of the plurality of data files with the object extraction pipeline according to a set of user-defined rules.

13. The system of claim 1, wherein the object extraction pipeline is configured to output the plurality of representational data objects.

14. A method, comprising:

integrating a system with one or more user-defined data sources comprising proprietary information;

reading a plurality of data files from the one or more user-defined data sources;

associating each data file of the plurality of data files with an object extraction pipeline based on at least one of a file type of the data file or an encoding format of the data file, the object extraction pipeline comprising one or more data processing operations executable by one or more processors;

filtering out non-proprietary information from the plurality of data files before extracting a plurality of representational data objects from the plurality of data files;

generating a set of multimodal fingerprints for each data file of the plurality of data files based on the plurality of representational data objects; and storing the set of multimodal fingerprints in a database.

15. The method of claim 14, wherein the plurality of data files comprise audio files, image files, video files, design files, tabular data files, code files, binary files, unstructured data files, or any combination thereof.

16. The method of claim 14, further comprising scanning a customer-defined database for data files that comprise non-proprietary or public information.

17. The method of claim 14, further comprising determining, by a threat detection entity, whether an outgoing file comprises proprietary information by comparing the set of multimodal fingerprints stored in the database with a set of fingerprints associated with the outgoing file.

18. The method of claim 17, further comprising blocking, by the threat detection entity, transmission of the outgoing file in response to determining that the outgoing file comprises proprietary information.

* * * * *